US012199337B2

(12) United States Patent
Lee et al.

(10) Patent No.: US 12,199,337 B2
(45) Date of Patent: Jan. 14, 2025

(54) ANTENNA FOR WEARABLE DEVICES

(71) Applicants: TE Connectivity Solutions GmbH, Schaffhausen (CH); Tyco Electronics AMP Korea Co., Ltd., Kyongsangbuk-Do (KR)

(72) Inventors: Chang Hyun Lee, Suwon (KR); Jung-Hoon Kim, Suwon (KR); Dong Wook Park, Suwon (KR); Kiran Vanjani, Fremont, CA (US)

(73) Assignees: TE CONNECTIVITY SOLUTIONS GmbH, Schaffhausen (CH); TYCO ELECTRONICS AMP KOREA CO., LTD., Gyeongsan (KR)

( * ) Notice: Subject to any disclaimer, the term of this patent is extended or adjusted under 35 U.S.C. 154(b) by 208 days.

(21) Appl. No.: 17/822,926

(22) Filed: Aug. 29, 2022

(65) Prior Publication Data

US 2024/0072423 A1 Feb. 29, 2024

(51) Int. Cl.
*H01Q 1/27* (2006.01)
*G04G 17/04* (2006.01)
*H01Q 9/04* (2006.01)

(52) U.S. Cl.
CPC ............. *H01Q 1/273* (2013.01); *G04G 17/04* (2013.01); *H01Q 9/0407* (2013.01)

(58) Field of Classification Search
CPC .......... H01Q 1/273; H01Q 1/243; H01Q 7/00; H01Q 1/48; H01Q 1/38; H01Q 1/36; H01Q 1/44; H01Q 1/50; H01Q 1/22; H01Q 9/42; H01Q 7/08; H01Q 21/28
See application file for complete search history.

(56) References Cited

U.S. PATENT DOCUMENTS

| | | | | |
|---|---|---|---|---|
| 2016/0099497 | A1* | 4/2016 | Lee | H01Q 1/38 343/702 |
| 2018/0287248 | A1* | 10/2018 | Han | H01Q 1/48 |
| 2019/0123439 | A1* | 4/2019 | Katz | G01S 19/36 |
| 2021/0057819 | A1 | 2/2021 | Yoo et al. | |
| 2022/0399639 | A1* | 12/2022 | Jia | H01Q 5/335 |

FOREIGN PATENT DOCUMENTS

| | | | |
|---|---|---|---|
| CN | 113690578 | A | 11/2021 |
| GB | 2591241 | A | 7/2021 |

OTHER PUBLICATIONS

Amendola et al., "Annular Ring Slot Radiating Element for Integrated Millimeter Wave Arrays", University of Calabria DEIS—Microwave Laboratory Rende, Italy, 6th European Conference on Antennas and Propagation (EUCAP), 4 pages, Mar. 2012.
Extended European Search Report for European Application No. 23193893.7 dated Feb. 8, 2024.
Le et al., "A Triple-Band Dual-Open-Ring High-Gain High-Efficiency Antenna for Wearable Applications", IEEE Access, vol. 9 pp. 118435-118445, Aug. 2021.

* cited by examiner

*Primary Examiner* — Wei (Victor) Y Chan

(57) ABSTRACT

An antenna assembly for use with a wireless communication wearable device. The antenna assembly includes a circuit board with components extending from a surface thereof. The antenna assembly has a first radiator antenna and a second radiator antenna which extends about the perimeter of the first antenna. A first slot is provided between the first radiator antenna and the second radiator antenna. The first slot separates the first radiator antenna from the second radiator antenna.

17 Claims, 5 Drawing Sheets

ANTENNA FOR WEARABLE DEVICES

FIELD OF THE INVENTION

The present invention relates to an antenna for use in a wireless communication wearable device.

BACKGROUND OF THE INVENTION

Many present day wearable devices, including wearable bands and smartwatches, have wireless network, short range wireless pairing, and global positioning system ("GPS") communication functions. Antenna design for such wearable devices can be very challenging because of the limited space and constrained form factors of such devices. With the limited space of the device, there may be a relatively small distance between the antenna and a ground plane. Nonetheless, sufficient clearance between the antenna and ground plane is typically required to maintain the antenna's radiation performance, such as radiation efficiency and antenna bandwidth. Antenna clearance may be increased by increasing the overall size of the product or decreasing the size of other components, for example the battery which may, depending on the circumstances, be contrary to certain design and user preferences. Wearable devices, when worn, are typically placed in close proximity to the user's skin. As such, the antennas within the device face additional challenges, such as body effects from close proximity to the skin.

It would be beneficial to provide a wearable device with an antenna which has improved performance when positioned close to the human body and when positioned in close proximity to the metallic pars of the wearable device.

SUMMARY OF THE INVENTION

An embodiment is directed to an antenna assembly for use with a wireless communication wearable device. The antenna assembly includes a circuit board with components extending from a surface thereof. The antenna assembly has a first radiator antenna and a second radiator antenna which extends about the perimeter of the first antenna. A first slot is provided between the first radiator antenna and the second radiator antenna. The first slot separates the first radiator antenna from the second radiator antenna.

An embodiment is directed to an antenna assembly for use with a wireless communication wearable device. The antenna assembly include a circuit board, a first radiator antenna and a second radiator antenna. The circuit board has components which extend from a surface thereof. The second radiator antenna is provided about the perimeter of the first antenna. A first slot is provided between the first radiator antenna and the second radiator antenna to separate the first radiator antenna from the second radiator antenna. A second slot is provided on the first radiator antenna, the second slot is wider than the first slot. The first radiator antenna is positioned between the circuit board and a bottom housing of the wireless communication wearable device positioned proximate skin of a user. The first radiator antenna is spaced between approximately 0.5 mm to approximately 2.0 mm from the skin of the user.

Other features and advantages of the present invention will be apparent from the following more detailed description of the illustrative embodiment, taken in conjunction with the accompanying drawings which illustrate, by way of example, the principles of the invention.

DETAILED DESCRIPTION OF THE INVENTION

Figure 1:
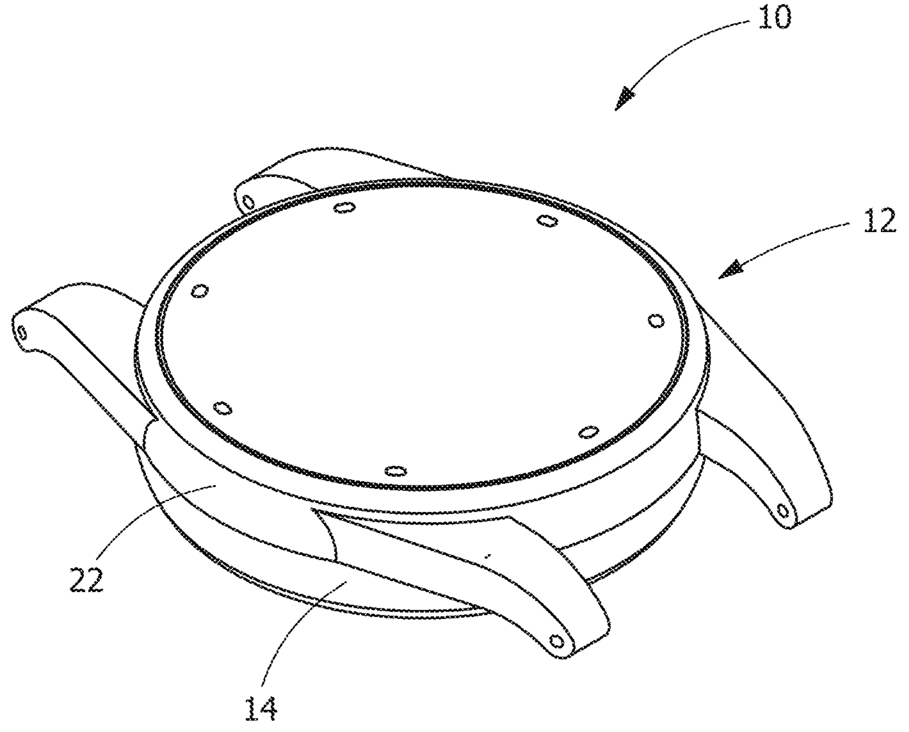
FIG. 1 is a perspective view of an illustrative wearable device which uses the antenna technology of the present invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

While the antenna of the present invention can be used with various wearable devices, for ease of explanation and understanding, the description and drawings are directed to an illustrative wrist watch which incorporates the antenna of the present invention.

FIG. 1 illustrates a front view of a user-wearable device 10, according to an illustrative embodiment. In the illustrative a smart watch 12 is shown, but other devices may be used. The user-wearable device 10 can be a standalone device which gathers and processes data and displays results to a user. Alternatively, the user-wearable device 10 can wirelessly communicate with a base station, which can be a mobile phone, a tablet computer, a personal data assistant (PDA), a laptop computer, a desktop computer, or some other computing device that is capable of performing wireless communication. The base station can, e.g., include a health and fitness software application and/or other applications, which can be referred to as apps. The user-wearable device 10 can upload data obtained by the device 10 to the base station, so that such data can be used by a health and fitness software application and/or other apps stored on and executed by the base station. Further, where the base station is a mobile phone, the user wearable device 10 can receive alerts or messages from the base station, which can be displayed to the user on the device 10.

Figure 2:
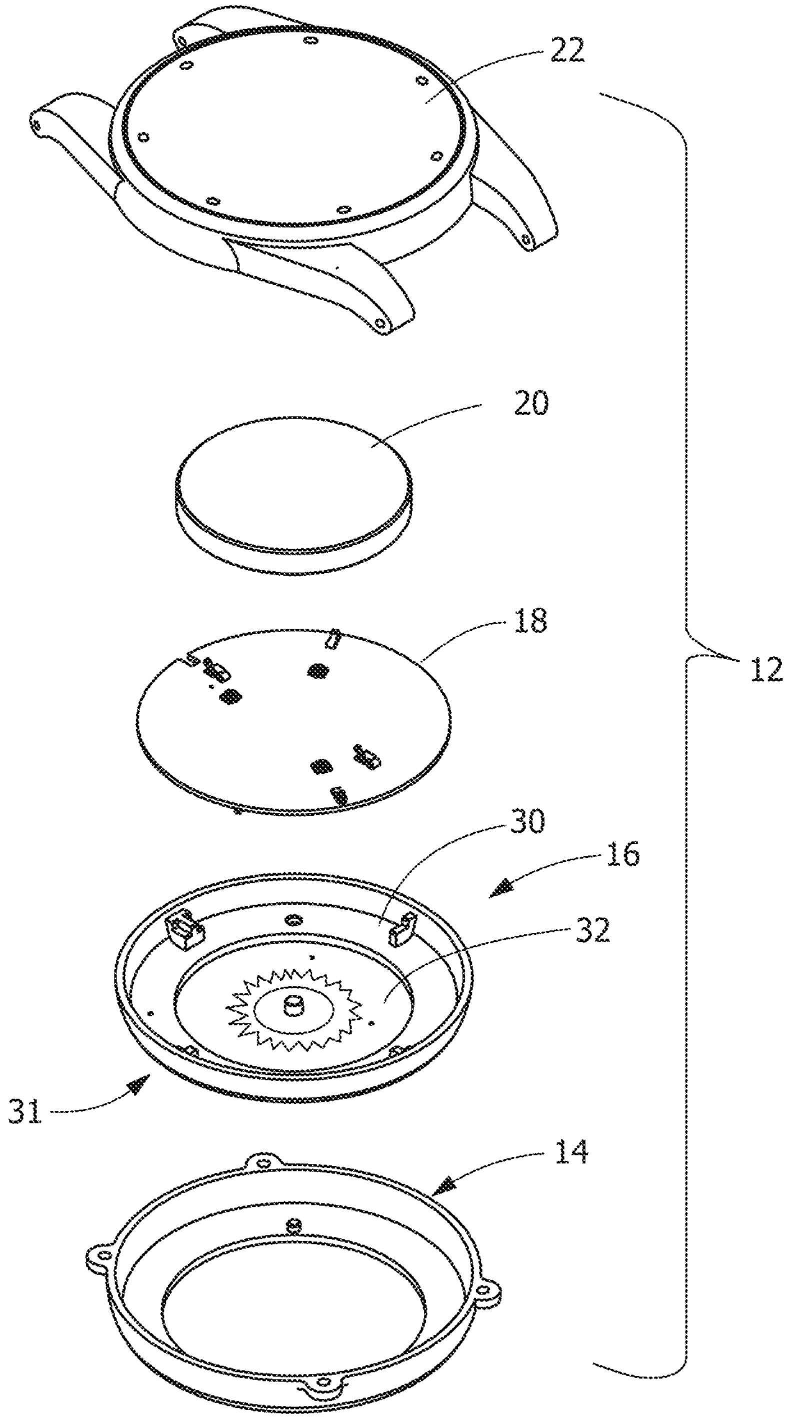
FIG. 2 is an exploded perspective view of the component of the illustrate wearable device of FIG. 1.

The illustrative user-wearable device 10 shown is a smart watch 12. As shown in FIG. 2, the watch 12 includes stacked components which allow the smart watch to operate properly. In the illustrative embodiment shown, the components include a first bottom cover 14, a second bottom cover 16, a circuit board 18, a battery 20 and a top cover 22. Other components, such as, but not limited to sensors, may also be provided without departing from the scope of the invention.

In the various embodiments a display can be used to show the time, date, day of the week and/or the like. The display can also be used to display activity and/or physiological metrics, such as, but not limited to, heart rate (HR), heart rate variability (HRV), calories burned, steps taken and distance walked and/or run. The display can also be used to display sleep metrics, examples of which are discussed below. These are just examples of the types of information that may be displayed on the display, which are not intended to be all encompassing.

A band, which can also be referred to as a strap because of its function, can be of different lengths than shown. For one example, a longer band can be used to strap the user-wearable device 10 around a user's chest, rather than around a user's wrist. In other words, it is also within the scope of embodiments for the user-wearable device to be a device other than a smart watch device.

The circuit board 18 may include various components or modules, such as, but not limited to, signal processing modules, power management modules, sensor modules and the like. The components or modules may be arranged on the circuit board 18 as needed for proper operation.

In the second bottom cover 16 may be made from material, such as, but not limited to, insulator material-ceramic, plastic/metallic material or hybrids thereof. The second bottom cover 16 is positioned proximate to the skin of the human body.

As shown in FIG. 2, in the illustrative embodiment, the second bottom cover 16 has an antenna assembly 31 which includes a first radiator antenna 30. The antenna assembly 31 also includes a planar member 32 with an antenna pattern provided thereon. The antenna pattern may be applied by using laser direct structuring ("LSD") flex/stamped metal. A second radiator antenna may also be provided in the top cover 22 or at other locations in the device 10.

The second bottom cover 16 may be molded out of a resin that includes an additive suitable for LDS. A laser may then transfer the antenna pattern to an upper surface of the second bottom cover 16. Finally, the second bottom cover 16 may go through a metallization process, in which the antenna pattern is plated with the proper metal. Other methods of applying the antenna pattern may be used.

In the illustrative embodiment, when the wearable device is assembled, the antenna pattern on the upper surface of the second bottom cover 16 is spaced close to the skin of the user, for example, between approximately 0.5 mm to approximately 2.0 mm from the skin of the user.

Figure 3:
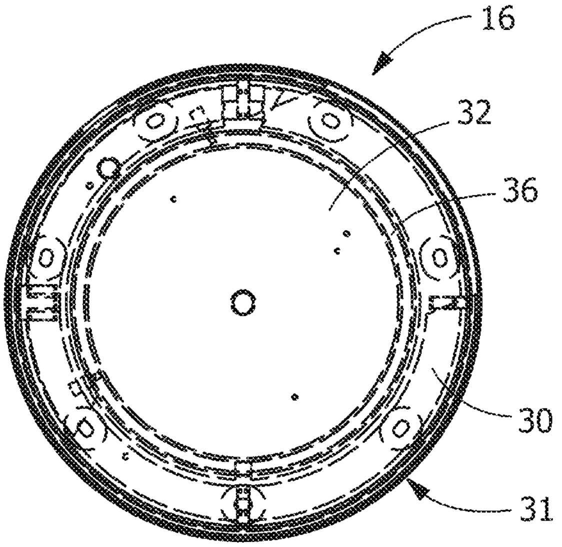
FIG. 3 a top view of an illustrative first and second radiator of the antenna of FIG. 2.

In the illustrative embodiment shown, the planar member 32 is spaced from the radiator antenna 30 by a uniform first slot 36. In the embodiment shown in FIGS. 1-3, the first slot 36 extends about the entire circumference of the planar member 30. In the embodiment shown, the first slot 36 has a width of between approximately 0.4 mm and approximately 1 mm. Other dimensions and configurations of the first slot 36 may be used.

Figure 4:
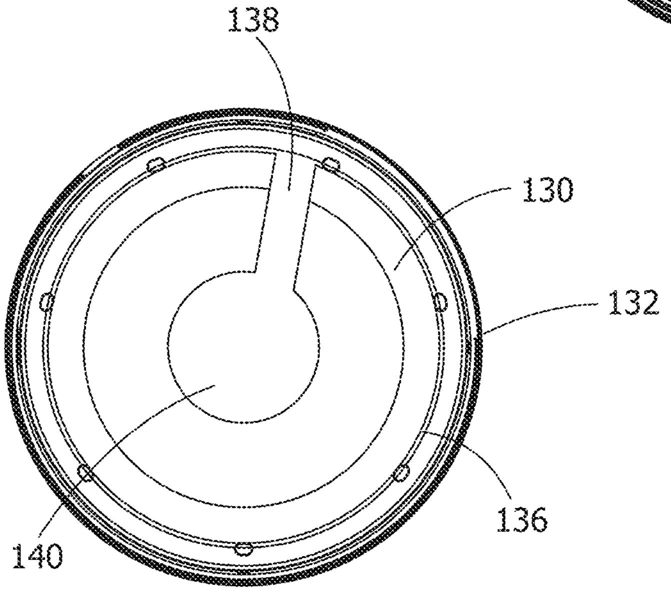
FIG. 4 is a top view of a first alternate illustrative embodiment of the radiator antennas.

Referring to FIG. 4, a first alternate illustrative embodiment of the first radiator antenna 130 and the second radiator antenna 132 is shown. In this embodiment, the first radiator antenna 130 is spaced from the second radiator antenna 132 by a uniform first slot 136. The first slot 136 extends about the entire circumference of the first radiator antenna 130. In the embodiment shown, the first slot 136 has a width of between approximately 0.4 mm and approximately 1 mm. Other dimensions and configurations of the first slot 136 may be used.

A second slot 138 is provided in the first radiator antenna 130. The second slot 138 extends radially from a center opening 140 of the first radiator antenna 130 to an edge of the first radiator antenna 130. The second slot 138 has a larger width than the first slot 136. In the embodiment shown, the second slot 138 has a width of between approximately 3 mm and approximately 6 mm. Other dimensions and configurations of the second slot 138 may be used. The second slot 138 is provided for high band resonant frequency control.

The first radiator antenna 130 and the second radiator antenna 132 may be on the same housing or may be on different housing. In various embodiments, the first radiator antenna 130 may be connected to the second radiator antenna 132 at a plurality of locations. In various embodiments, the second radiator antenna 132 may apply a coupling feed effect to provide low-band antenna resonant impedance performance.

Figure 5:
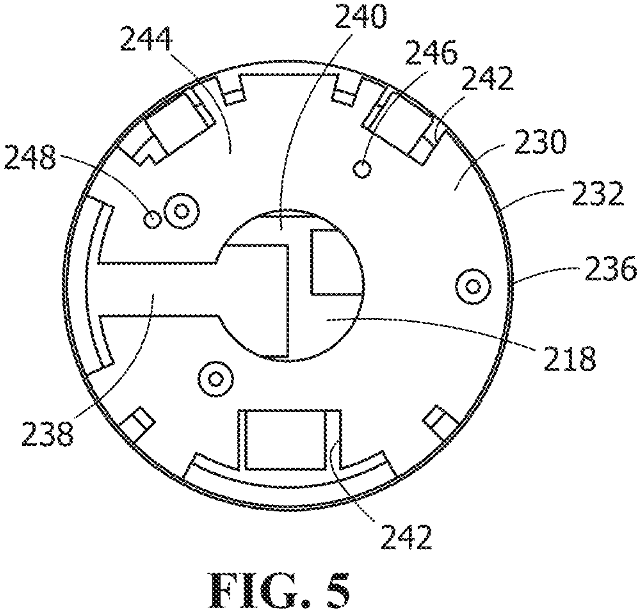
FIG. 5 is a bottom view of a second alternate illustrative embodiment of the radiator antennas.

Referring to FIG. 5, a second alternate illustrative embodiment of the first radiator antenna 230 and the second radiator antenna 232 is shown. In this embodiment, the first radiator antenna 230 is spaced from the second radiator antenna 232 by a uniform first slot 236. The first slot 236 extends about the entire circumference of the first radiator antenna 230. In the embodiment shown, the first slot 236 has a width of between approximately 0.4 mm and approximately 1 mm. Other dimensions and configurations of the first slot 236 may be used.

A second slot 238 is provided in the first radiator antenna 230. The second slot 238 extends radially from a center opening 240 of the first radiator antenna 230 to an edge of the first radiator antenna 230. The second slot 238 has a larger width than the first slot 236. In the embodiment shown, the second slot 238 has a width of between approximately 4 mm and approximately 8 mm. Other dimensions and configurations of the second slot 238 may be used.

The first radiator antenna 230 has additional openings 242 which extend through the first radiator antenna 230. The positioning and dimensions of the openings 242 may vary depending upon the configuration of the circuit board 218 and the components thereon. The first radiator antenna 230 has a slightly curved surface 244. The curved surface 244 of the first radiator antenna 230 is spaced from the components on the circuit board 218. In the illustrative embodiment shown, the curved surface 244 of the first radiator antenna 230 is spaced between approximately 0.5 mm and approximately 1.0 from the components of the circuit board 218. Other dimensions of the spacing between the first radiator antenna 230 and the components on the circuit board 218 may be used.

The first radiator antenna 230 and the second radiator antenna 232 may be on the same housing or may be on different housing. In various embodiments, the first radiator antenna 230 may be connected to the second radiator antenna 232 at a plurality of locations. In various embodiments, the second radiator antenna 232 may apply a coupling feed effect to provide low-band antenna resonant impedance performance.

The use of second slot 238 and openings 240 provide for high band resonant frequency control. The spacing of the first radiator antenna 230 from the circuit board 218 reduces the influence of the metal component of the circuit board 218 on the signal.

The first radiator antenna 230 has a ground connection 246 and a feed connection 248 provided on the curved surface 244. By adjusting the spacing between the ground connection 246 and the feed connection 248, the low band resonant frequency and the impedance can be changed. By adjusting the dimensions of the first slot 236 and the second slot 238, the high band resonant frequency and the impedance can be changed.

Figure 6:
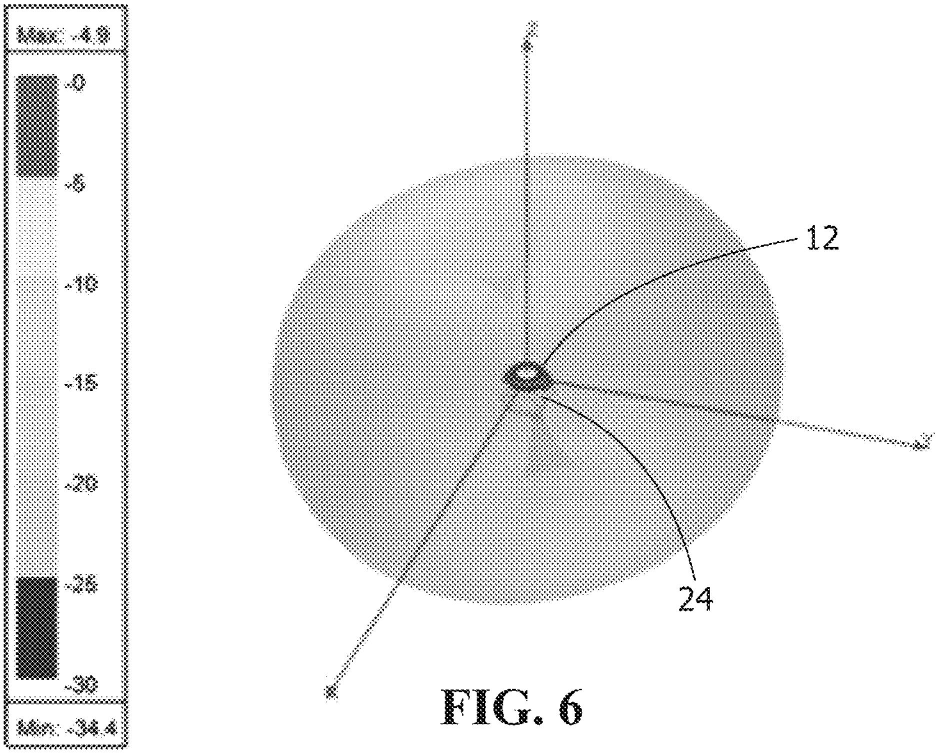
FIG. 6 is a three dimensional view of the polar radiation plot of the wearable device of FIG. 1 at 0.71 GHz.
Figure 7:
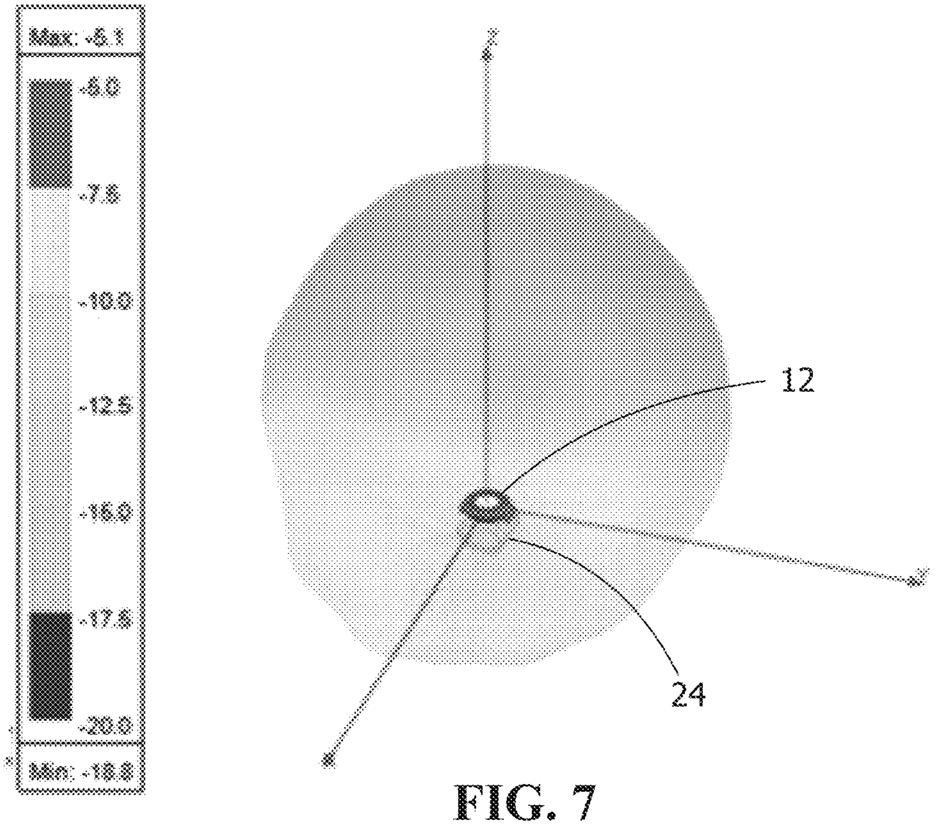
FIG. 7 is a three dimensional view of the polar radiation plot of the wearable device of FIG. 1 at 1.75 GHz.
Figure 8:
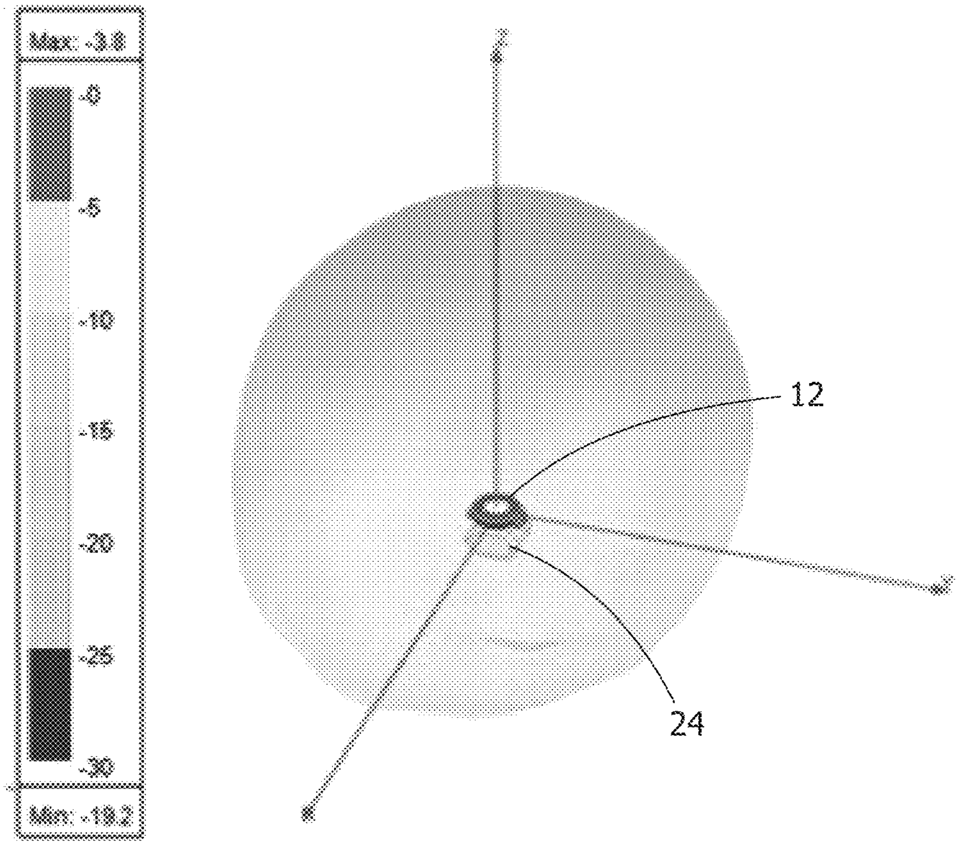
FIG. 8 is a three dimensional view of the polar radiation plot of the wearable device of FIG. 1 at 1.90 GHz.

The use of the first radiator antenna 30,130, 230 and the second radiator antenna 132, 232 has an excellent H-field of omni-direction radiation (H(XY)-plane) of low frequency band and a high E-field of directional radiation (ZX, ZY) in high frequency band. As shown in FIGS. 6, 7 and 8, the supports maximum antennal performance in all directions except for radiation degradation caused by the human body. The antenna configuration also overcomes adverse conditions caused by close proximity to metallic elements.

FIG. 6 illustrates the three dimensional radiation plot from the device 10 secured to a wrist 24 of a user at 0.71 GHz. FIG. 7 illustrates the three dimensional radiation plot from the device 10 secured to a wrist 24 of a user at 1.75 GHz. FIG. 8 illustrates the three dimensional radiation plot from the device 10 secured to a wrist 24 of a user at 1.90 GHz.

The antenna assembly 31 can be used over multiple bands, wide frequency range and multiple protocols, including, but not limited to IoT, LTE CAT M1, LTE and Wi-Fi. The antenna assembly 31 can minimize the influence of metallic objects and human bodies and can support a wide 4G band.

While the invention has been described with reference to a preferred embodiment, it will be understood by those skilled in the art that various changes may be made, and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. An antenna assembly for use with a wireless communication wearable device, the antenna assembly comprising:

a circuit board having components extending from a surface thereof;

a first radiator antenna with an antenna pattern provided thereon, the first radiator antenna has a curved surface positioned over and spaced from the surface of the circuit board;

a second radiator antenna provided about the perimeter of the first radiator antenna;

a uniform first slot provided between the first radiator antenna and the second radiator antenna, the first slot extending about an entire circumference of the first radiator antenna, the first slot separating the first radiator antenna from the second radiator antenna;

wherein the first radiator antenna and the second radiator antenna supports maximum antennal performance in all directions except for radiation degradation caused by a human body.

2. The antenna assembly as recited in claim 1, wherein a second slot is provided on the first radiator antenna, the second slot is provided for high band resonant frequency control.

3. The antenna assembly as recited in claim 2, wherein the second slot is wider than the first slot.

4. The antenna assembly as recited in claim 1, wherein the second radiator antenna is a ring which extends around the first radiator antenna.

5. The antenna assembly as recited in claim 1, wherein the first radiator antenna has a feed connection spaced from a ground connection.

6. The antenna assembly as recited in claim 1, wherein the first slot has a width of between approximately 0.4 mm and approximately 1.0 mm.

7. The antenna assembly as recited in claim 1, wherein the first radiator antenna is positioned proximate the circuit board, the first radiator antenna is spaced between approximately 0.5 mm and approximately 1.0 mm from the components of the circuit board.

8. The antenna assembly as recited in claim 2, wherein the second slot extends radially from a center opening of the first radiator antenna.

9. The antenna assembly as recited in claim 8, wherein the second slot has a width of between approximately 3 mm and approximately 8 mm.

10. The antenna assembly as recited in claim 8, wherein additional openings extend through the first radiator antenna.

11. The antenna assembly as recited in claim 8, wherein the first radiator antenna has a ground connection and a feed connection.

12. The antenna assembly as recited in claim 1, wherein the wireless communication wearable device is a wrist watch.

13. The antenna assembly as recited in claim 1, wherein the first radiator antenna is positioned between the circuit board and a bottom housing of the wireless communication wearable device which is positioned proximate skin of a user.

14. The antenna assembly as recited in claim 11, wherein the first radiator antenna is spaced between approximately 0.5 mm to approximately 2.0 mm from the skin of the user.

15. The antenna assembly as recited in claim 1, wherein the first radiator antenna and the second radiator antenna are provided in a first housing of the wireless communication wearable device.

16. The antenna assembly as recited in claim 1, wherein the first radiator antenna and the second radiator antenna are provided in different housings of the wireless communication wearable device.

17. An antenna assembly for use with a wireless communication wearable device, the antenna assembly comprising:

a circuit board with components extending from a surface thereof;

a first radiator antenna with an antenna pattern provided thereon, the first radiator antenna having a surface positioned over and spaced from the surface of the circuit board;

a second radiator antenna provided about the perimeter of the first radiator antenna;

a first slot provided between the first radiator antenna and the second radiator antenna, the first slot extending about an entire circumference of the first radiator antenna, the first slot separating the first radiator antenna from the second radiator antenna;

a second slot provided on the first radiator antenna, the second slot being wider than the first slot;

the first radiator antenna positioned between the circuit board and a bottom housing of the wireless communication wearable device positioned proximate skin of a user;

the first radiator antenna spaced between approximately 0.5 mm and approximately 2.0 mm from the skin of the user and spaced between approximately 0.5 mm and approximately 1.0 mm from the components of the circuit board.

* * * * *